(12) United States Patent
Sandler et al.

(10) Patent No.: US 8,058,598 B2
(45) Date of Patent: Nov. 15, 2011

(54) FOURIER TELESCOPIC IMAGING SYSTEM AND METHOD

(75) Inventors: Dave Sandler, San Diego, CA (US);
Brett Spivey, Encinitas, CA (US); Louis Cuellar, Albuquerque, NM (US); Paul Fairchild, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 12/381,023

(22) Filed: Mar. 5, 2009

(65) Prior Publication Data

US 2010/0278521 A1 Nov. 4, 2010

Related U.S. Application Data

(60) Provisional application No. 61/068,408, filed on Mar. 5, 2008.

(51) Int. Cl.
*G01J 1/20* (2006.01)
(52) U.S. Cl. .................. 250/201.9; 250/208.1
(58) Field of Classification Search ............... 250/208.1, 250/201.9
See application file for complete search history.

(56) References Cited

U.S. PATENT DOCUMENTS

| | | | | |
|---|---|---|---|---|
| 4,792,231 A | * | 12/1988 | Fried | 356/521 |
| 4,950,880 A | * | 8/1990 | Hayner | 250/201.9 |
| 5,093,563 A | * | 3/1992 | Small et al. | 250/201.9 |
| 5,969,334 A | * | 10/1999 | Hutchin | 250/201.9 |
| 6,052,180 A | * | 4/2000 | Neal et al. | 356/121 |
| 2003/0071123 A1 | * | 4/2003 | Tsikos et al. | 235/454 |
| 2004/0030255 A1 | * | 2/2004 | Alfano et al. | 600/476 |
| 2008/0142602 A1 | * | 6/2008 | Knowles et al. | 235/462.42 |
| 2010/0008588 A1 | * | 1/2010 | Feldkhun et al. | 382/206 |
| 2010/0110208 A1 | * | 5/2010 | Gerwe | 348/222.1 |
| 2010/0278521 A1 | * | 11/2010 | Sandler et al. | 396/155 |

* cited by examiner

*Primary Examiner* — John Lee
(74) *Attorney, Agent, or Firm* — John R. Ross (57) ABSTRACT

A system and method for imaging far away fast moving objects such as satellites in low earth orbit. The object to be imaged is illuminated simultaneously with a composite beam comprised of a large number of separate laser beams from a large number of laser sources each from a separate position with each of the separate laser beams shifted in frequency with respect to each other beam so as to produce a large number of beat frequencies in the composite beam. The positions of the laser sources are changed rapidly during an illumination period of a few seconds. Light reflected from the object is collected in a large number of light buckets and information defining the intensity of the collected reflected light as a function of time is stored. The positions and frequencies of each of the laser sources are also recorded and stored as a function of time. The stored information defining the intensity of the collected reflected light is analyzed by one or more computer processors utilizing special algorithms to produce a image of the object.

1 Claim, 5 Drawing Sheets

FOURIER TELESCOPIC IMAGING SYSTEM AND METHOD

CROSS REFERENCE TO RELATED APPLICATIONS

This application claims the benefit of Provisional Patent Application Ser. No. 61/068,408 filed Mar. 5, 2008.

FEDERALLY SPONSORED RESEARCH

The present invention was conceived in the course of work performed under Contract No. F29601-97-9-0152 and FA9451-04-D-0300 with the United States Air Force and the United States Government has rights in the invention.

FIELD OF INVENTION

The present invention relates to telescopes and in particular to Fourier telescopic imaging systems.

BACKGROUND OF THE INVENTION

Fourier telescopy is an imaging technique that uses multiple beams from spatially separated transmitters to illuminate a distant object. A large number of wide aperture telescopes (referred to as "light buckets") are used to detect the light reflected from the object with sufficient signal-to-noise ratio, but no attempt is made to form an image directly from the collected light. Each beam is shifted relative to the other beams to produce interference between beams at the target. Thus interference patterns are produced on the target. These interference patterns are encoded in the time dependent reflections from the target. The reflected light collected by the light buckets is Fourier transformed into a frequency spectrum as a function of time and this spectrum is correlated with known positions and frequencies of the transmitted beams as a function of time to derive a two dimensional image of the target.

This imaging technique has been studied extensively for use in imaging deep space objects. In prior art system designs, for example, three beams would be transmitted simultaneously in pulses to image a geosynchronous object. It would take many hours to transmit the tens of thousands of pulses needed to construct all of the spatial frequencies needed to form an image of the object. Because the position and orientation of the object would remain essentially constant, this approach seemed feasible. Three illuminating apertures were used in order to eliminate the degrading atmospheric phase aberrations using the well known technique of phase closure, and then the closure phases used to reconstruct the illuminated target image.

Fourier telescopy is an active imaging method which interferes spatially diverse, frequency-encoded laser beams on a distant target, and records a time history of the reflected intensity measured by a single photodetector on a large receiver. Phase closure among the received triplets plays a key role in canceling out random atmospheric phase errors between laser beams. This imaging technique has been studied extensively for use in imaging deep space objects under previous Air Force programs. See for example: R. B. Holmes and T. J. Brinkley, "Reconstruction of images of deep-space objects using Fourier telescopy," in *Digital Image Recovery and Synthesis IV*, T. J. Shultz and P. S. Idell, eds., Proc. SPIE 3815, pp 11-22 (1999); M. Thornton, J. Oldenettel, D. Hult, K. Koski, T, Depue, E. L. Cuellar, et. al, "GEO Light Imaging National Testbed (GLINT) Heliostat Design and Testing Status", in *Free-Space Laser Communication and Imaging*, D. G. Voelz and J. C. Ricklin, eds., Proc. SPIE, Vol. 4489, pp 48-59 (2002); and E. Louis Cuellar, James Stapp, Justin Cooper, "Laboratory and Field Experimental Demonstration of a Fourier Telescopy Imaging System", Proc. SPIE 5896, (2005).

In a particular prior art design, for example, three beams would be transmitted simultaneously in pulses to image a geosynchronous object. It would take many hours to transmit the tens of thousands of pulses needed to construct all of the spatial frequencies needed to form an image of the object. Because the position and orientation of the object would remain essentially constant, this approach seemed feasible. Three illuminating apertures were used in order to eliminate the degrading atmospheric phase aberrations using the technique of phase closure[5], and then the closure phases used to reconstruct the illuminated target image[2]. Previous experiments in both the lab and field have verified that this implementation of the Fourier Telescopy technique to imaging geostationary targets is both viable and robust. See for example: J. Mathis, E. L. Cuellar, J. Cooper, A. Morris, P. Fairchild, D. Hult, K. Koski, L. Ramzel, and M. Thornton, "Field Experiment Performance of the Receiver Elements for a Fourier Telescopy Imaging System" Proc. SPIE 5896, (2005).

What is needed is a system to image fast mobbing far away objects such as satellites in low earth orbits.

SUMMARY OF THE INVENTION

The present invention provides a system and method for imaging far away fast moving objects such as satellites in low earth orbit. The object to be imaged is illuminated simultaneously with a composite beam comprised of a large number of separate laser beams from a large number of laser sources each from a separate position with each of the separate laser beams shifted in frequency with respect to each other beam so as to produce a large number of beat frequencies in the composite beam. The positions of the laser sources are changed rapidly during an illumination period of a few seconds. Light reflected from the object is collected in a large number of light buckets and information defining the intensity of the collected reflected light as a function of time is stored. The positions and frequencies of each of the laser sources are also recorded and stored as a function of time. The stored information defining the intensity of the collected reflected light is analyzed by one or more computer processors utilizing special algorithms to produce a image of the object.

In a preferred embodiment 23 separated laser beams illuminate the object simultaneously to produce 253 beat frequencies. The transmit locations of each of these illuminating beams are quickly changed so that 50 separate samples of reflected light, each sample containing 253 beat frequencies and 50 different sets of transmit locations, can be obtained within a time period of a few seconds. This provides a matrix of data containing 12,650 elements.

This matrix of data is analyzed with the special algorithm to produce an image of the object. The algorithm iterates the following 4 steps:

1. image update, which uses a INUFT function,
2. amplitude update based on the image, in its simple form,
3. amplitude Kolmogorov filtering, using the banded matrix approach,
4. amplitude renormalization.

Applicants have tested the algorithm by creating a set of artificial measurements. First a set of ideal spectrum values is created by simply taking the transform of the image. The spectrum values are taken on a non-uniform grid corresponding to the range of baselines defined by the possible beam configurations. Then the ideal measurements are modified by simulated phase disturbances according to the atmosphere model. Additional amplitude and phase disturbances are added to simulate the effect of measurement noise. This set of data is then fed into the reconstruction algorithm.

The case studied so far seems to converge within 100 iterations. This case uses the following parameters:

23 laser beams in 21 transmitter apertures, 7 clicker positions per aperture, 85 total configurations, 2.5 m satellite, 1000 km target range, 1.041 laser wavelength, 1 m telescope apertures, 1.73 m center-to-center spacing of transmitter telescope apertures, clicker spacing equal to Nyquist wavelength, 2 samples per $t_0$, 60 samples, SNR variable, but good performance with noise up to 10% of the DC level when accumulated over $t_0$ (14% per measurement for 2 samples per $t_0$).

DETAILED DESCRIPTION OF PREFERRED EMBODIMENTS

First Preferred Embodiment

Figure 1:
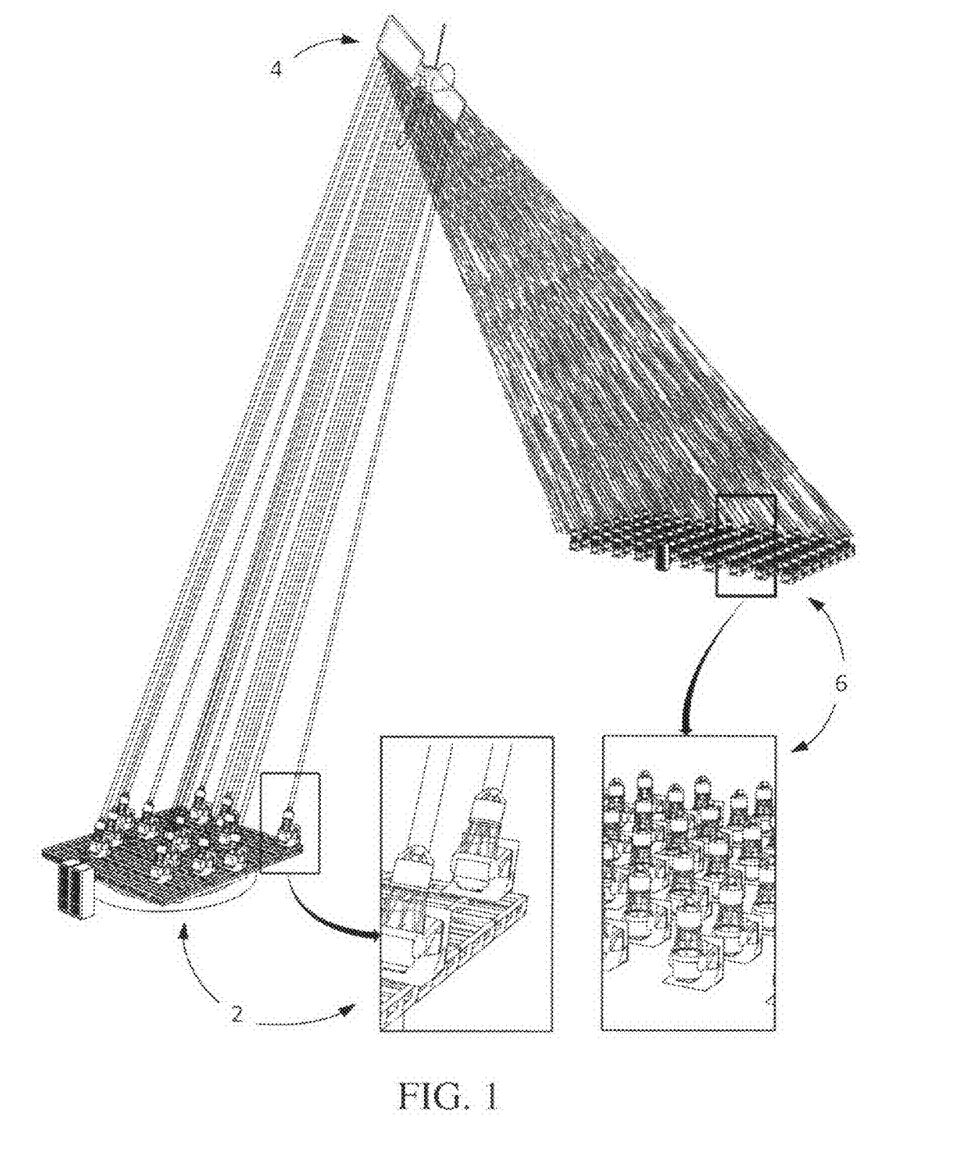
FIG. 1 is a drawing of a preferred embodiment of the present invention.

FIG. 1 is a drawing of a preferred embodiment of the present invention. A laser transmitter unit designed to transmit a large number of separate beams is shown at 2 illuminating a low earth orbit satellite 4 and a set of 75 inexpensive telescopes 6 each telescope having a 1 meter diameter aperture functions as light buckets to collect light reflected from the illuminated object. In FIG. 1 thirteen transmitters are shown. However in Applicants' first preferred embodiment 21 transmitters are used as arranged in FIG. 2. The transmitter unit 2 includes 23 lasers transmitted by 21 telescopes. One of the telescopes includes three laser transmitters transmitting one beam each. The other twenty telescopes include just one laser each transmitting one beam.

Clickers

Associated with each beam is a clicker. The clicker moves the beam to a new position around the periphery of the transmitting aperture. Each movement of the beam creates a small change in the separation between the new beam position and all of the other beam positions. The clicker is designed to change the position of each laser within each telescope so as to provide a means to quickly change the positions of any or all of the transmit lasers. The clicker is preferably designed to change positions in about 10 milliseconds. In a preferred embodiment dwell times of 0.1 second are provided and a total of 50 dwell times are programmed for each image. The clicker movements are such that the set of separations between beams is not repeated during a single operation. This leads to efficient sampling of the spatial frequencies of the object. The transmitting telescopes are preferably mounted on massive pivoting platform. The platform can be pivoted to optimize the projection of the various baselines formed by the transmitter beams for viewing of objects that do not pass directly overhead.

Frequency Shifts

The laser model assumes that a single continuous wave infrared (1.08 micron wavelength —2.778 GHz) low power laser oscillator will provide a beam that is split into many beams which are each used as the seed source for 23 high-power laser amplifiers. Each laser amplifier output would then be fiber coupled to the various transmitter apertures. The wavelength will be approximately the same for all beams, however, each beam will be shifted in frequency by a small amount so that the beat frequency between any 2 beams is unique and detectable by affordable detectors. Applicants' preferred way to achieve a unique set of beat frequencies is to shift each beam according to the marks on an optimal Golomb ruler. For example, for 23 beams we would base the frequency differences on a ruler of 23 marks which has marks from 0 to 372 (arbitrary units). To avoid cross talk, we choose the unit of frequency separation to be 10 kHz. Preferred frequencies are listed in Table I.

TABLE I

| Golomb Frequency Separations (kHz) | | | | | | | | | | | | |
|---|---|---|---|---|---|---|---|---|---|---|---|---|
| 0 | 10 | 30 | 60 | 110 | 170 | 250 | 340 | 440 | 550 | 720 | 850 | 1060 | 1270 |
| 1510 | 1770 | 1990 | 2160 | 2460 | 2830 | 3330 | 3560 | 3720 | | | | |

To generate the above frequencies a YAG laser is used to produce a seed beam that is separated into 23 separate beams each of which is shifted in frequency with an acousto-optic modulator driven by RF signals to produce the 23 separate frequencies listed in the Table I. Each of the separate beams is then amplified in a high power laser amplifier and then coupled to one of the transmitter telescopes.

Fringe Patterns

If the separation between two transmitting beams is d, the distance to a low-earth orbiting satellite is R, the nominal wavelength of the laser beams is $\lambda$ and the difference in frequency is $\Delta f$ then the spacings S between the bright fringes on the satellite will be:

$$S = \lambda R/d.$$

The bright fringes which are perpendicular to a line connecting the two laser sources will scan across the satellite in a direction parallel to the line at a velocity v equal to:

$$v = \lambda R/d/\Delta f.$$

So if $R=1.07\times10^6$ m, d is 0.5 m and $\Delta f$ is 30 kHz, the fringe spacings will be:

$$S=(1.08\times10^{-6}\text{ m})(1.07\times10^6\text{ m})/0.5\text{ m}=2.311\text{ m}$$

The velocity of the fringes across satellite will be:

$$v=(2.311\text{ m})(30\text{ kHz})=6.933\text{ m/millisecond}.$$

If S is 10 m and $\Delta f$ is 3,330 kHz, $$S=(1.08\times10^{-6}\text{ m})(1.07\times10^6\text{ m})/10\text{ m}=0.116\text{ m and}$$

$$v=(0.116\text{ m})(3,330\text{ kHz})=386\text{ m/millisecond}.$$

Creating Two-Dimensional Images

In preferred embodiments the collected data in the form of intensity vs time is Fourier transformed to provide a matrix of intensity as a function of time for each of the beat frequencies. This data is correlated with the known positions and frequencies of each of the transmit beams as a function of time to produce a matrix of image data that is processed with a high-speed computer with special algorithms to produce a two-dimensional image of the object.

This preferred embodiment is directed to imaging objects in low earth orbit. The limited engagement time and rapidly changing orientation of the object with respect to a ground station means that the data needed to form an image must be obtained in a few seconds. This leads to the concept of transmitting many beams at once. FIG. 1 shows a conceptual drawing of a LEO imaging system where the multi-beam transmitter is composed of individual tracking telescopes and lasers, and the light bucket receiver is composed of a large farm of inexpensive telescopes. For example, if 23 beams are transmitted, there are 253 pairs, and so 253 spatial frequencies are sampled at once. If we rearrange the beam positions on the ground in 50 different configurations, we sample a total of 12,650 different spatial frequencies which should be sufficient to form a good image of the object. The challenge is to rearrange beam configurations quickly and to process the data to eliminate the distortion in the data caused by path aberrations and noise. The development of the novel reconstruction algorithm to process the data is the subject of this paper.

Figure 2:
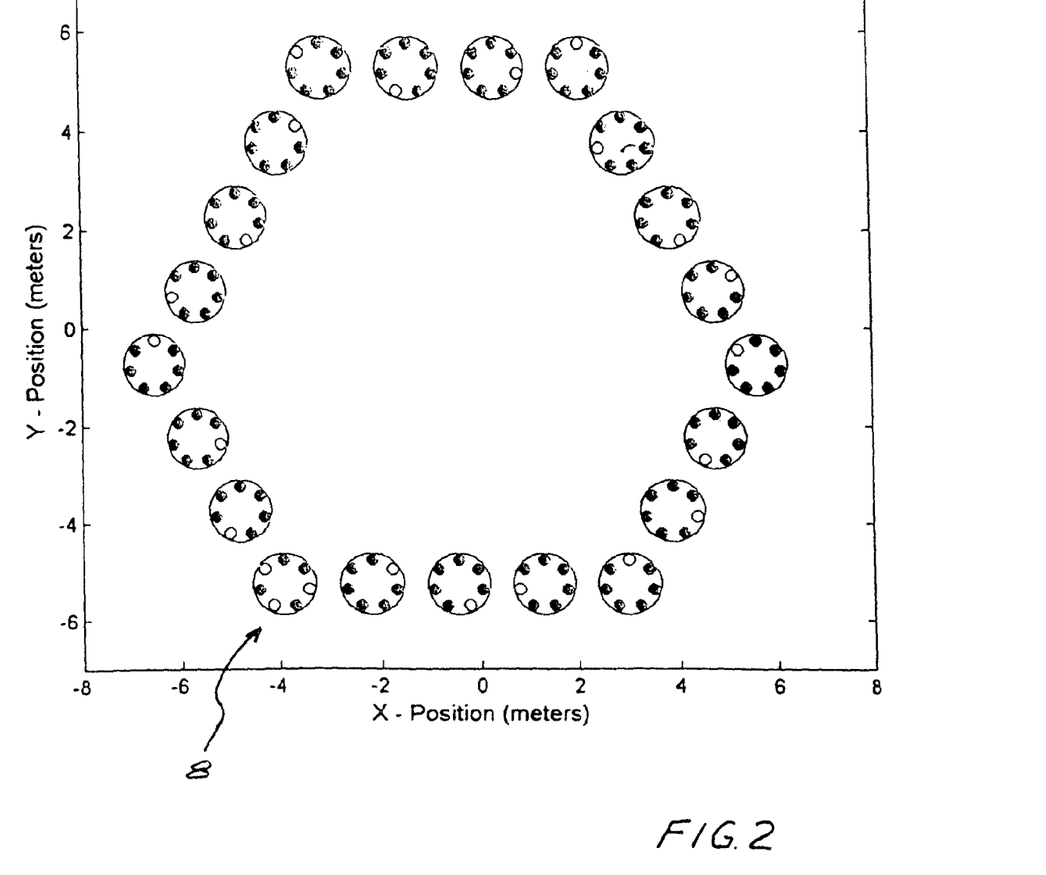
FIG. 2 shows an arrangement of telescopes and transmitters.

One possible arrangement of transmitting telescopes is shown in FIG. 2. Here a telescope of aperture size on the order of 1 meter transmits a laser beam of about 10 centimeters through a location near the periphery of the larger aperture. In this model there are 7 different locations for the beam around the edge of the aperture. Twenty of the 21 telescopes broadcast a single beam. One, the "super" aperture has 3 active beams. With 7 possible beam positions in 21 telescopes, there are a many of different arrangements giving rise to a large number of baseline configurations. A "baseline" is the length and orientation of the vector connecting any pair of beam positions. The spatial frequencies measured in the target image are proportional to the transmitter baselines by the relation:

$$\vec{k}_{image} = \frac{2\pi(\vec{r}_i - \vec{r}_j)}{\lambda R}$$

where $\vec{k}_{image}$ is the spatial frequency component of the target measured by the interference of laser beams broadcast from transmitter apertures i and j, $\lambda$ is the illuminating laser wavelength, and R is the range to the target. The beams are moved from one transmitting position to another by a dynamic optical element called a "clicker".

Atmospheric Phase Closure

Applicants' original concept for Fourier Telescopy (FT), started in the GLINT program, acquired data in "triplets", that is, three beams were simultaneously broadcast. Since there are three beats between pairs of beams, there were three items of data. There are also three unknown atmospheric phase shifts, but since overall phase is unmeasured, the number of unknowns is reduced by one, and so as a net result there is one piece of useful data. This is then usually formed into a nugget of data called a triplet by multiplying the beat signals together, which eliminates the atmospheric phase shifts. Thus if the measurements are $$M_{1,2}=I_{1,2}\exp(i\Delta\Phi_1-i\Delta\Phi_2)$$

$$M_{2,3}=I_{2,3}\exp(i\Delta\Phi_2-i\Delta\Phi_3)$$

$$M_{3,1}=I_{3,1}\exp(i\Delta\Phi_3-i\Delta\Phi_1)$$

where M is the measurement, 1 is the Fourier amplitude we are trying to measure, and $\Delta\Phi$ is the unknown phase shift, then the product of the three is the triplet T:

$$T_{123}=M_{1,2}M_{2,3}M_{3,1}=I_{1,2}I_{2,3}I_{3,1}$$

and it can be seen that the atmospheric phase shift cancels, leaving a piece of data which can be input into a reconstruction algorithm. The SNR requirement for the individual triplets formed is somewhat stressing. Since the term SNR is so vague, we define as new term MNR as:

$$MNR = \frac{\text{modulated signal including fringe visibility}}{\text{measurement noise for the modulation}}$$

Then the requirement is that the MNR for each of the three measurements must on average be approximately one or greater. If the MNR drops below one, then the triplet formed becomes very noisy. Since the fringe visibility can be very small (at the one to few percent level), it becomes difficult to get high enough SNR to result in an average MNR greater than one.

For the LEO application, we immediately recognized that more than three beams must be broadcast in order to acquire the data quickly enough, due to the limited engagement time. We had originally assumed that the noise properties would be equivalent to the triplet treatment. If this were the case, then one could calculate the relative number of photons needed vs. number of beams. If the photons are divided into B beams, then the modulation for each beat scales as:

$$|M| \propto |I| * \left(\frac{2}{B}\right) * n_p$$

where $n_p$ is the number of photons. Noise scales like:

$$N \propto \sqrt{n_p}$$

and the number of beats is $$\frac{B*(B-1)}{2}$$

If we allocate a certain number of photons per beat measurement as a figure of merit, then $$n_p \propto \frac{B*(B-1)}{2}$$

and therefore the MNR scales like $$MNR \propto |I| * \left[\frac{2(B-1)}{B}\right]^{1/2}$$

This scaling vs. B is weak, but gets slightly better for larger B. Thus, we had originally concluded that it would require comparable total number of photons broadcast for many beams as for three beams; moreover we originally thought that each measurement must have a MNR that on average exceeds one during the time that the atmosphere is frozen in phase (on the order of a millisecond for slewing beams). Scaling versus number of beams turns out to be much more favorable than this somewhat simplistic analysis. One way of grasping this intuitively is to notice that while the number of beats is $$\frac{B*(B-1)}{2},$$

the number of unknown atmospheric phase shifts is B−1 (we remove the overall phase degree of freedom). Thus, there is a high degree of redundancy for large B. This allows us to take measurements over many realizations of the atmosphere and still have plenty of data to remove atmospheric phase, and as a result we avoid the limitations of the atmospheric time constant, at least to a degree. This becomes particularly advantageous when using CW lasers, but even more generally allows data to be accumulated without the more difficult triplet MNR threshold requirement.

The technique that we use to implement this we call "Atmospheric Phase Closure" (APC). With APC, we use the $$\frac{B*(B-1)}{2}$$

measurement to solve for B unknown atmospheric phases for each time step. This algorithm is implemented iteratively, and simultaneously for all of the time steps. The output is the phase history at each transmitter location. The parameters left unknown are a single overall unknown phase for each transmitter. Thus, we effective turn a series of individual time measurements into a single time measurement, as if the atmosphere were frozen during this time period.

To present an intuitive illustration, consider first a triplet for one instant in time. For this case there are 3 beams, with 3 beats and therefore 3 measurements. The unknown varying parameters are the 3 atmospheric phases, of which the overall common phase is irrelevant, leaving 2 net unknowns that change with the atmosphere. The unknown static parameters are the 3 target Fourier amplitudes. If we repeat this measurement with a different atmosphere, the 2 atmospheric unknowns change, while the 3 target amplitudes do not. On the other hand, (and this is a subtle point), no matter how many times we repeat this measurement, we cannot recover all 3 target amplitudes, since there will always be the uncertainty of the average of the 2 unknown atmospheric parameters. (Other different baseline measurements are required to recover the other parameters). This corresponds to what we already know: that a triplet has one net piece of information encoded in it. So to summarize, a triplet has 2 varying pieces of information and 1 static piece of information.

Now consider a 4-plet. There are 4 beams with 6 beats. The 4 beams produce 3 net atmospheric variable unknowns while the 6 beats allow extraction of 6−3=3 recoverable static unknowns. For a 20-plet there are 19 variable unknowns with 171 recoverable static unknowns, etc, (Table 2):

TABLE 2

Relationship between Beams, Beats, and Unknowns

| # beams | # beats | # variable unk | # static unk |
|---------|---------|----------------|--------------|
| 3       | 3       | 2              | 1            |
| 4       | 6       | 3              | 3            |
| 20      | 190     | 19             | 171          |

Table 2 gives an intuitive feel for why atmospheric phase closure works. As the number of beams goes up, the number of atmospheric varying unknowns increases relatively slowly, while the number of static unknowns increases rapidly. One might expect the benefit of repeating measurements to increase as the ratio of static parameters to variable parameters increases. A single realization of twenty beams has a total of 190 unknowns to extract, but then additional atmospheric realizations only add 19 more unknowns per realization.

In fact, this simple observation is also borne out in simulation. There ends up being approximately an $N^{1/2}$ benefit when the atmospheric phase closure algorithm is used. As a nuance, there is some additional improvement possible by picking "good" arrangements of transmitters. The most effective embodiment of this, as we have observed through simulation, seems to involve a concept we call "bridging". Bridging is a configuration of transmitter locations that seems to be more robust with respect to noise. It can be explained with the following diagram, where A, B, C, D and E represent transmitter locations (see FIG. 3).

Figure 3:
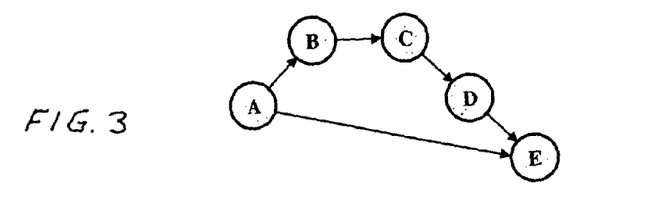
FIG. 3 describes a concept called "bridging".

The beat signal between A and E is very weak because of the separation. (We have found that the strength of the modulation looks like a Gaussian random variable, with expected value very closely proportional to the inverse of the transmitter separation). On the other hand, the strength of modulation of the short measurements AB, BC, CD, and DE are relatively strong. An algorithm that solves for the unknown atmospheric phase shift would therefore be able to find the relative phase between A and E using the "bridge" of short measurements, each with good MNR, rather than solely relying on the AE measurement with low MNR. Moreover, the algorithm if implemented optimally would also make use of the not-too-bad AC, BD, and CE measurements, and weigh these all together in a "best" way.

The fact that the algorithms perform better with bridging is inferred from the fact that configurations that are contiguous seem to consistently outperform disjointed configurations. Examples of some good contiguous configurations (FIG. 4) and some poor (i.e., disjoint) configurations (FIG. 5) appear below.

Figure 4A:
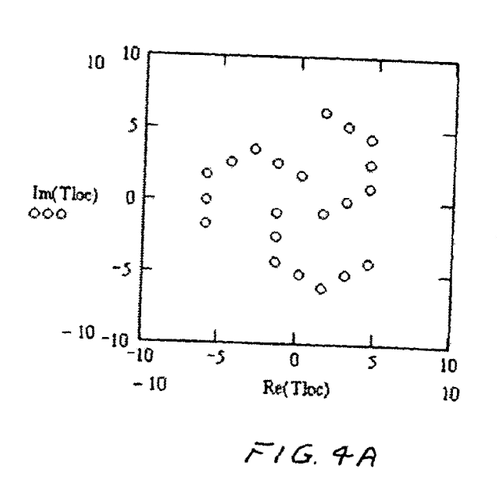
FIGS. 4A and 4B are examples of good configurations.
Figure 4B:
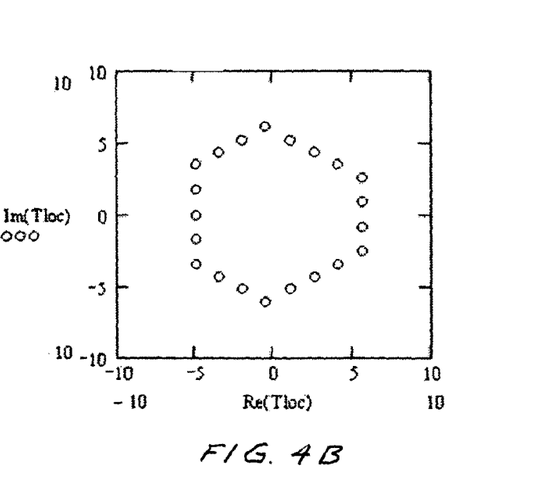
Figure 5A:
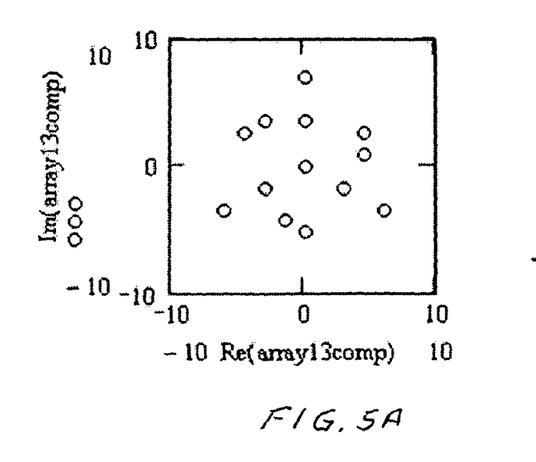
FIGS. 5A and 5B are examples of poor (i.e. disjointed) configurations.
Figure 5B:
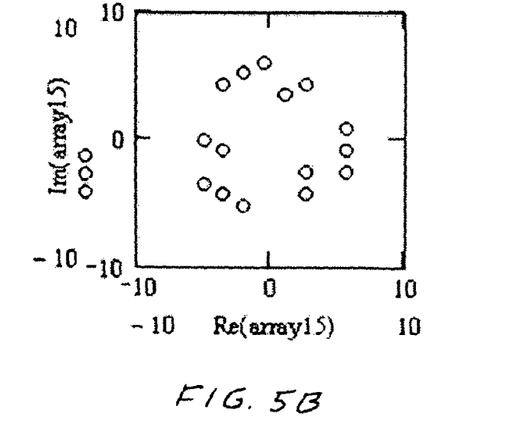

The disjoint configurations are more efficient at covering the (u,v) plane, but perform a bit worse with respect to APC.

If MNR is not marginal (which will be discussed later), then the disjoint configurations still work fine with APC.

Image Reconstructor Derivation

The detailed algorithm is iterative, and attempts to maximize a certain function that represents the log likelihood of the atmospheric phase shifts with respect to the data, leaving the image Fourier amplitudes as unknown but unchanging during the atmospheric realizations. The algorithm that we have developed also takes into account the correlation in atmospheric phase between successive time steps which improves performance a bit.

Turbulence Statistics

We begin the discussion of the image reconstruction algorithm by first considering the statistics of SAINT data. Since the turbulence creates phase shifts in the transmitted beams, with a Kolmogorov spectrum, we use the time series $\Phi(t)$ with structure function $$[(\phi(t) - \phi(t + \Delta t))^2]_{avg} = \left(\frac{\Delta t}{t_0}\right)^{\frac{5}{3}}$$

In particular, we consider equally spaced time steps at intervals dt: $\Phi(n \cdot dt) = \Phi_n$.

The correlation function R is $$R = (\phi_i \cdot \phi_j)_{avg} = -\frac{1}{2} \cdot \left[(i-j) \cdot \frac{dt}{t_0}\right]^{\frac{5}{3}} + \overline{\phi^2}$$

When we evaluate physical quantities, we need to let $\overline{\Phi^2}$ approach infinity. The phase probability density function is $$\rho(\vec{\phi}) = N \cdot \exp\left(-\frac{1}{2} \cdot \vec{\phi} \cdot R^{-1} \cdot \vec{\phi}\right)$$

where N is a normalization constant so that the total integrated probability is 1. N is unimportant for these calculations. Defining the matrix $$Ko1_{i,j} = (i-j)^{\frac{5}{3}},$$

we can write the inverse of the correlation function as $$R^{-1} = -2 \cdot \left(\frac{dt}{t_0}\right)^{-\frac{5}{3}} \cdot \left(Ko1 + \overline{\phi^2}\right)^{-1} = -2 \cdot \left(\frac{dt}{t_0}\right)^{-\frac{5}{3}} \cdot Ko1^{(-1)}$$

where we define $$Ko1^{(-1)} = Ko1^{-1} - \frac{(Ko1^{-1} \cdot \vec{1}) \cdot (Ko1^{-1} \cdot \vec{1})^T}{(\vec{1})^T \cdot Ko1^{-1} \cdot \vec{1}}$$

This last expression evaluates to a matrix with diagonal terms that are nearly constant except at the upper left and lower right. Here is the upper left corner:

|   | 0 | 1 | 2 | 3 | 4 | 5 | 6 | 7 | 8 |
|---|---|---|---|---|---|---|---|---|---|
| 0 | −0.816 | 1.179 | −0.307 | −0.01 | −0.016 | −0.007 | −0.005 | −0.003 | −0.002 |
| 1 | 1.179 | −2.519 | 1.622 | −0.293 | 0.013 | −0.005 | −0.001 | −0 | 0 |
| 2 | −0.307 | 1.622 | −2.634 | 1.619 | −0.299 | 0.01 | −0.007 | −0.002 | −0.001 |
| 3 | −0.01 | −0.293 | 1.619 | −2.634 | 1.619 | −0.299 | 0.01 | −0.007 | −0.002 |
| 4 | −0.016 | 0.013 | −0.299 | 1.619 | −2.635 | 1.618 | −0.299 | 0.01 | −0.007 |
| 5 | −0.007 | −0.005 | 0.01 | −0.299 | 1.618 | −2.635 | 1.618 | −0.299 | 0.01 |
| 6 | −0.005 | −0.001 | −0.007 | 0.01 | −0.299 | 1.618 | −2.635 | 1.618 | −0.299 |
| 7 | −0.003 | −0 | −0.002 | −0.007 | 0.01 | −0.299 | 1.618 | −2.635 | 1.618 |
| 8 | −0.002 | 0 | −0.001 | −0.002 | −0.007 | 0.01 | −0.299 | 1.618 | −2.635 |

This is basically a convolution with boundary conditions. Moreover, the matrix is dominated by the center 5 diagonals and is symmetrical. In order for the reconstructor to converge, we need to work with complex amplitudes rather than phases. Expressing the amplitudes in term of the phases mathematically causes a branch cut when the amplitude approaches zero. This is often called the phase wrap problem. Using complex amplitudes, however, requires us to use a more complicated probability function instead of the simple phase probability function. The amplitude probability function in general is unwieldy, but fortunately approximations seem to perform well.

We will later consider more complex approximations for the amplitude probability, but for now we consider a simple approximation: as long as the time step is small, then $$Re(a_i \cdot \overline{a_j}) = \cos(\phi_i, \Phi_j)$$

is weighted to $\Phi_i - \Phi_j = 0$ when the phase is correlated, so we can with reasonable accuracy replace $$(\Phi_i - \Phi_j)^2 \text{ with } (|a_i - a_j|)^2 = a_i \cdot \overline{a_i} + a_j \cdot \overline{a_j} - a_i \cdot \overline{a_j} - a_j \cdot \overline{a_i}$$

which is accurate to second order in $\Phi$. Since $R^{-1}$ is symmetrical and has rows and columns with mean zero, we can extend the substitution to $$\vec{\Phi} \cdot R^{-1} \cdot \vec{\Phi} \sim \vec{a} \cdot R^{-1} \cdot \overline{(\vec{a})}$$

If we use only the dominant 5 diagonals of $R^{-1}$, this expression can be explicitly written out as a sum. In the interior, $$\vec{\phi} \cdot R^{-1} \cdot \vec{\phi} \sim 2 \cdot \left(\frac{dt}{t_0}\right)^{-\frac{5}{3}} \cdot \sum_i \left[\overline{a_i} \cdot \begin{pmatrix} 0.3 \cdot a_{i-2} - \\ 1.6 \cdot a_{i-1} + \\ 2.6 \cdot a_i - \\ 1.6 \cdot a_{i+1} + \\ 0.3 \cdot a_{i+2} \end{pmatrix}\right],$$

and at the edge, $$2 \cdot \left(\frac{dt}{t_0}\right)^{-\frac{5}{3}} \cdot \begin{bmatrix} \overline{a_0} \cdot (0.9 \cdot a_0 - 1.2 \cdot a_1 + 0.3 \cdot a_2) + \\ \overline{a_1} \cdot (-1.2 \cdot a_0 + 2.5 \cdot a_1 - 1.6 \cdot a_2 + 0.3 \cdot a_3) \end{bmatrix},$$

with a similar expression at the other edge.

Combined Probability Function

Next we will include the measurements into the probability function. Finding the maximum of this combined probability function will give us the best image estimate.

The measurement statistics are taken to have the following properties:

1. The measurement noise level is the same for each measurement. This should be true or at least nearly true for the actual SAINT system. It is easy to modify the formulae for non-uniform noise, however.
2. There is no correlation in the noise between any of the measurements. This will be true for Poisson statistics, but other effects such as saturation could slightly alter this assumption. Still, it should be nearly true for the actual SAINT system. This lack of correlation refers to both noise from different beat frequencies at the same time, and noise from different times for a given beat frequency.

As long as the atmospheric amplitude is normalized $|a|=1$, we can express the measurement error in two different equivalent forms. These forms will result in slightly different algorithms, which will allow a parameter to be chosen empirically. The two expressions for the error are:

$M(\text{cfg}, t, ap1, ap2) \cdot a(\text{cfg}, t, ap1) \cdot \overline{a(\text{cfg},t,ap2)} - NUFT(\text{img}, \text{cfg}, ap1, ap2)$ $M(\text{cgf}, t, ap1, ap2) - NUFT(\text{img}, \text{cgf}, ap1, ap2) \cdot \overline{a(\text{cfg},t,ap1)} \cdot a(\text{cfg}, t, ap2)$ There are a number of parameters that need to be explained here:

M is the measurement. It is a function of
- cfg, the configuration index which represents the arrangement of transmitter beam positions (clicker positions),
- t, the time index which represents the time series of the measurement over a single configuration,
- ap1, the aperture index of the first aperture causing the beat,
- ap2, the aperture index of the second aperture with which the first aperture is beating against. The two apertures will define a unique beat frequency.

NUFT signifies Fourier transform. The NU part stands for non-uniform, because the baselines that define the transform are on a non-uniform grid, and thus becomes a more complicated operation from a normal FFT. It has the parameter
- img, the reconstructed image.

The two expressions for the error are related by a phase, so when we evaluate the error magnitude of our solution there should be no difference. The difference comes in to play, however, during the iterations, because we do not absolutely constrain $|a|=1$. Letting $|a|$ deviate from 1 and in fact pass through 0 is critical for the convergence of the algorithm, as it prevents phase-wrapping problems. Notice that, while converging, if $|a| \ne 1$, then the expressions are somewhat different.

The combined probability function in its two forms is $$\rho(M, a) = \exp\left[-\frac{1}{2} \cdot \left[\sum_{(cfg,t,ap1,ap2)} \frac{\left(\left\| \begin{array}{c} M(cfg, t, ap1, ap2) \cdot \\ a(cfg, t, ap1) \cdot \\ \overline{a(cfg, t, ap2)} - \\ NUFT(img, cfg, ap1, ap2) \end{array} \right\|\right)^2}{noise^2} + \ldots \right. \right.$$
$$\left. \left. -2 \cdot \left(\frac{dt}{t_0}\right)^{-\frac{5}{3}} \cdot \sum_{(cfg,t1,t2,ap)} \begin{pmatrix} a(cfg, t1, ap) \cdot \\ Ko1(t1,t2)^{(-1)} \cdot \\ \overline{a(cfg, t2, ap)} \end{pmatrix} \right] \right]$$

$$\rho(M, a) = \exp\left[-\frac{1}{2} \cdot \left[\sum_{(cfg,t,ap1,ap2)} \frac{\left(\left\| \begin{array}{c} M(cfg, t, ap1, ap2) - \\ NUFT(img, cfg, ap1, ap2) \cdot \\ \overline{a(cfg, t, ap1)} \cdot \\ a(cfg, t, ap2) \end{array} \right\|\right)^2}{noise^2} + \ldots \right. \right.$$
$$\left. \left. -2 \cdot \left(\frac{dt}{t_0}\right)^{-\frac{5}{3}} \cdot \sum_{(cfg,t1,t2,ap)} \begin{pmatrix} a(cfg, t1, ap) \cdot \\ Ko1(t1,t2)^{(-1)} \cdot \\ \overline{a(cfg, t2, ap)} \end{pmatrix} \right] \right]$$

Given the measurements, we will use our algorithm to maximize the probability with respect to img and a. As mentioned earlier, we will allow $|a|$ to deviate from 1 to prevent the algorithm from getting stuck on phase wraps. On the other hand, we do want to control the magnitude somewhat so that it does tend to 1 eventually.

The above expressions for probability are in fact the probability for M and a given the image img. This can be written using the notation p(M, a; img). What we really need, however, is the probability of img and a given M. The expression that relates the two is $\rho(img,a;M) = \rho(M,a;img) * \rho(img) / \rho(M)$.

$\rho(M)$, the probability of a given measurement, is irrelevant because we are given M as an input. There is some discussion needed about $\rho(img)$, however.

We assume that we know two things about the image, contained in $\rho(img)$: 1) positivity and 2) limited extent. Since we are making intensity measurements, we know that the image values are positive. The extent (limits on the size of the object), to some degree, must also be known. This is due to the fact that we are taking measurements on a grid that is not a uniform array, and so we must be able to assume some commonality between closely spaced transmitter locations. Notice that the non-uniform baselines are inevitable for LEO: even if the transmitters were placed on a uniform array with respect to the ground, the satellite motion would prevent the baselines from staying on a uniform array as the satellite moves across the sky, changing angle, range, and aspect.

The extent limits do not need to be known to high accuracy. The input to the current algorithm requires merely an x and y width, and these widths just need to constrain the solution space so that the measurement count significantly exceeds the unknown count. The precise limits on this are not known at this point, and need to be found by computer simulation, but the demonstration done to date used a box that was oversized by approximately 50% in one dimension and 25% in the other. Of course, the tighter the limits, the better the reconstruction might be.

Finding the Maximum Probability

There are only 2 values for p(img):
1. img is allowed, if it is within the extent and positive, in which case all img realizations are assumed to be equal probability, or
2. img is not allowed, if it is not entirely real, positive, and within bounds, in which case the probability is zero To find the maximum of ρ(img, a; M), we can therefore maximize the expression ρ(M, a; img) subject to the constraints of ρ(img). The constraints on img need to be applied somewhere in the algorithm to force the constraints. This application of the constraints will be discussed later.

We will minimize $-\ln(\rho)$ by taking derivatives with respect to img and a, and setting the result to zero.

First, we take the derivative with respect to $\overline{a(cfg,t,ap)}$, giving $$0 = \sum_{ap2} \frac{\begin{pmatrix} M(cfg, t, ap, ap2) \cdot \\ a(cfg, t, ap) \cdot \\ \overline{a(cfg, t, ap2)} - \\ NUFT(img, cfg, ap, ap2) \end{pmatrix} \cdot \overline{M(cfg, t, ap, ap2)} \cdot a(cfg, t, ap2)}{noise^2} \ldots +$$

$$\left(\frac{dt}{t_0}\right)^{-\frac{5}{3}} \cdot \sum_{t2} \begin{pmatrix} -Kol(t, t2)^{(-1)} \cdot \\ a(cfg, t2, ap) \end{pmatrix}$$

and $$0 = \sum_{ap2} \frac{\begin{pmatrix} \overline{NUFT(img, cfg, ap, ap2)} \cdot \\ a(cfg, t, ap) \cdot \\ \overline{a(cfg, t, ap, ap2)} - \\ \overline{M(cfg, t, ap, ap2)} \end{pmatrix} \cdot NUFT(img, cfg, ap, ap2) \cdot a(cfg, t, ap2)}{noise^2} \ldots +$$

$$\left(\frac{dt}{t_0}\right)^{-\frac{5}{3}} \cdot \sum_{t2} \begin{pmatrix} -Kol(t, t2)^{(-1)} \cdot \\ a(cfg, t2, ap) \end{pmatrix}$$

To implement this we will use an iterative approach; we begin by separating the terms with a(cfg,t,ap). We first need to specially address the DC terms from the sum, those associated with self beating from the same aperture, when ap=ap2. On the one hand, these terms are nearly constant, since any phase errors cancel, and so can be ignored with little consequence. On the other hand, these terms are very large, since they represent the zero spatial frequency, and far dominate the other terms. In the iteration, inclusion of these terms has the effect of greatly dampening the amplitude update, and as a result preventing convergence. With this modification we have the update relations $$a(cfg, t, ap) = \frac{\sum_{(ap2 \neq ap)} \begin{pmatrix} NUFT(img, cfg, ap, ap2) \cdot \\ \overline{M(cfg, t, ap, ap2)} \cdot \\ a(cfg, t, ap2) \end{pmatrix} + \left(\frac{dt}{t_0}\right)^{-\frac{5}{3}} \cdot noise^2 \cdot \sum_{(t2 \neq t)} \begin{pmatrix} -Kol(t, t2)^{(-1)} \cdot \\ a(cfg, t2, ap) \end{pmatrix}}{\sum_{(ap2 \neq ap)} \begin{bmatrix} (|M(cfg, t, ap, ap2)|)^2 \cdot \\ (|a(cfg, t, ap2)|)^2 \end{bmatrix} + \left(\frac{dt}{t_0}\right)^{-\frac{5}{3}} \cdot noise^2 \cdot -Kol(t, t)^{(-1)}}$$

$$a(cfg, t, ap) = \frac{\sum_{(ap2 \neq ap)} \begin{pmatrix} NUFT(img, cfg, ap, ap2) \cdot \\ \overline{M(cfg, t, ap, ap2)} \cdot \\ a(cfg, t, ap2) \end{pmatrix} + \left(\frac{dt}{t_0}\right)^{-\frac{5}{3}} \cdot noise^2 \cdot \sum_{(t2 \neq t)} \begin{pmatrix} -Kol(t, t2)^{(-1)} \cdot \\ a(cfg, t2, ap) \end{pmatrix}}{\sum_{(ap2 \neq ap)} \begin{bmatrix} (|NUFT(img, cfg, ap, ap2)|)^2 \cdot \\ (|a(cfg, t, ap2)|)^2 \end{bmatrix} + \left(\frac{dt}{t_0}\right)^{-\frac{5}{3}} \cdot noise^2 \cdot -Kol(t, t)^{(-1)}}$$

The similarity of the two forms is apparent. We will decide empirically between these two forms, or something in between, by testing.

We will next take the derivative of ρ(M, a; img) with respect to img. The two cases give $$\text{Re}\left[-(\overline{NUFT})^T \cdot \sum_t \left[\begin{pmatrix} M(cfg, t, ap1, ap2) \cdot \\ a(cfg, t, ap1) \cdot \\ \overline{a(config, t, ap2)} \\ NUFT(img, cfg, ap1, ap2) \end{pmatrix} - \right]\right] = 0$$

$$\text{Re}\left[-(\overline{NUFT})^T \cdot \sum_t \left[\begin{pmatrix} M(cfg, t, ap1, ap2) \cdot \\ a(cfg, t, ap1) \cdot \\ \overline{a(cfg, t, ap2)} \\ NUFT(img, cfg, ap1, ap2) \cdot \\ (|a(cfg, t, ap1)|)^2 \cdot \\ (|a(cfg, t, ap2)|)^2 \end{pmatrix} - \right]\right] = 0,$$

where $(\overline{NUFT})^T$ denotes the transpose operation of NUFT. As long as M(ap1,ap2) is the complex conjugate of M(ap2,ap1), as it should be, we do not need the real Re operation.

In order to solve for img in these equations, it is necessary to have an inverse operation to NUFT. This operation, INUFT, is one of the most time consuming parts of the algorithm. It is an iteratively computed routine (running within the main iterations), which calls NUFT several times each call. Fortunately, it does seem to converge accurately and quickly, and so is not too great of a computational burden.

Incorporated also into INUFT is the application of the constraint of extent or any other support definition desired, and the forced application of either real or positive solution (positive is used for the SAINT reconstruction algorithm).

The INUFT routine we have implemented, in a nutshell, solves $\overline{(\text{NUFT})}^T \cdot \text{NUFT} \cdot \text{OUT} = \overline{(\text{NUFT})}^T \cdot \text{IN}$ with the constraint (OUT within extent) and the constraint (OUT≧0). The procedure will not be described here in detail, but is basically implemented by using an easily computed approximate INUFT routine, and iterating the error $\epsilon$=NUFT·OUT-11−IN through this approximate routine, each time applying the constraints, until convergence. Typically this routine only needs ~10 iterations. With this routine in hand, the image update algorithm is implemented by the similar expressions $$img = INUFT\left[\frac{\sum_t\left(\frac{M(cfg, t, ap1, ap2) \cdot a(cfg, t, ap1) \cdot}{\overline{a(cfg, t, ap2)}}\right)}{\sum_t 1}\right]$$

$$img = INUFT\left[\frac{\sum_t\left(\frac{M(cfg, t, ap1, ap2) \cdot a(cfg, t, ap1) \cdot}{\overline{a(cfg, t, ap2)}}\right)}{\sum_t\left[\frac{(|a(cfg, t, ap1)|)^2 \cdot}{(|a(cfg, t, ap2)|)^2}\right]}\right]$$

Again we can see the similarity, and again we will decide empirically between these two forms or something in between. Note that if |a|=1, these expressions are identical, so the difference really lies in the convergence properties.

Bin Size Scaling Problem

The above prescription of sequential updates to arrive at a solution does seem to give good results for a variety of cases. This is the basic prescription used originally for the atmospheric phase closure demonstrations. This technique, however, was found to have a flaw in the following critical case. A reasonable requirement for the algorithm is that if we divide the signal into finer and finer bins, with the noise level increasing by the square root of the bin density, we should expect very little effect on the output result. Since the data originally comes in this finely sampled form, we should be able to input the data in raw form or binned first, as long as the bins are smaller than the atmospheric time constant $t_0$.

One obstacle that had to be overcome to investigate this was the figure-of-merit algorithm. The original atmospheric phase closure algorithm used a figure-of-merit algorithm that computed the average error in a. This approach was simple, but caused a problem when sampling density is varied: the error in a clearly degrades at higher sampling density, but we really want to know if the reconstructed M degrades. This is not simple, for a single configuration of atmospheric phase closure, because the reconstructed M for a single configuration has certain static random phases. These static phases are reconstructed in the complete algorithm, but for development we needed a technique that did not require the complete reconstruction.

The new figure-of-merit algorithm we devised actually is an iterative solver itself, which finds these static random phases. The error in M that is left after the static phase corrections are applied becomes the figure-of-merit. In addition, we added the ability to weigh the errors by a power of the magnitude, so that the high spatial frequency errors were not swamped by the much larger low spatial frequencies. We were thus able to evaluate performance with varying bin size. This brought to light a scaling problem. The algorithm described in the previous section degrades as we divide the data into finer bins. The reason for this is not entirely clear. Fortunately, we were able to devise a solution which performs similar operations and which we expect to be very nearly optimal. This revised algorithm does perform just as well for finely sampled as for coarsely sample data.

Solution

The solution we found was to divide the amplitude update formula into sections. It seems that the form given, $$a(cfg, t, ap) = \frac{\sum_{(ap2 \neq ap)}\left(\frac{NUFT(img, cfg, ap, ap2) \cdot \overline{M(cfg, t, ap, ap2)} \cdot}{a(cfg, t, ap2)}\right) + \left(\frac{dt}{t_0}\right)^{-\frac{5}{3}} \cdot noise^2 \cdot \sum_{(t2 \neq t)}\left(\frac{-Ko1(t, t2)^{(-1)} \cdot}{a(cfg, t2, ap)}\right)}{\sum_{(ap2 \neq ap)}\left[\frac{(|M(cfg, t, ap, ap2)|)^2 \cdot}{(|a(cfg, t, ap2)|)^2}\right] + \left(\frac{dt}{t_0}\right)^{-\frac{5}{3}} \cdot noise^2 \cdot -Ko1(t, t)^{(-1)}}$$

attempts to do too much in one step. Notice that 3 basic operations are taking place simultaneously:

1. an update based on the current estimate of img,
2. an atmospheric filtering operation,
3. a normalization.

The same comment applies to the alternate form.

Our solution was to make these operations sequential. The first operation, the update based on the current estimate of img, becomes the simple $$a(cfg, t, ap) = \sum_{ap2 \neq ap}\left(\frac{NUFT(img, cfg, ap, ap2) \cdot \overline{M(cfg, t, ap, ap2)} \cdot}{a(cfg, t, ap2)}\right)$$

The second operation is a Kolmogorov time filter, a=timefilter(a).

This filter can be chosen to take many different forms, from simple to complex. This topic will be discussed in detail later on.

The third operation is a renormalization, a=renormalize(a).

To investigate renormalization, we tried several different techniques, and evaluated the performance empirically when run in the new divided phase closure algorithm. The key is to balance the ability of a to pass through zero, when needed for convergence, while also in the long run encouraging |a|=1. The best approach was found to be the following:

$$a(cfg, t, ap) = \frac{a(cfg, t, ap)}{\sqrt{\begin{array}{c}(|a(cfg, t, ap)|)^2 \cdot \\ \alpha + \\ mean_t[(|a(cfg, t, ap)|)^2] \cdot \\ (1-\alpha)\end{array}}}$$

where the mean operation is over a time series for a given aperture and configuration. The parameter $\alpha$ can be varied, but the choice does not seem too critical as long as it is not near 0 or 1, and it seems like $\alpha$=0.5 is always a near optimal choice.

We have found that the divided algorithm appears to always outperform the original combined update algorithm. Moreover, the divided algorithm is not at all sensitive to the input time sample density, just as long as the density is at least enough to sample the atmosphere properly.

Atmospheric Time Filter Function

The atmospheric Kolmogorov time filter can be as simple or as complex as desired. We investigated a number of cases, and found a fairly simple approach to work almost as well as more complicated approaches.

We looked at several time filter functions. The four most interesting cases were investigated in detail to compare performance. The approach taken was to generate a Kolmogorov time series at various sample rates, add various noise levels, and put the signal plus noise through one of the functions to be tested. The figure-of-merit was the agreement of the output of this function to the original input signal without noise.

The four functions were:

1. The most obvious linear approach is to minimize $$\frac{(a_{out} - a_{in})^2}{\sigma^2} + a_{out} \cdot R^{-1} \cdot a_{out}$$

where $\sigma^2$ is the noise level, and $K^1$ is the inverse of the correlation function defined above. This has solution $$a_{out} = (R^{-1} \cdot \sigma^2 + I)^{-1} \cdot a_{in}$$

where I is the identity matrix. We also allowed an empirical scaling factor on $\sigma$. It seems that the performance is a little better when $\sigma$ is scaled by ~0.5.

2. The second approach is identical to the first, with $K'$ replaced with the approximate five diagonal form discussed above. It is important to remember that when the center diagonals are extracted, the rows and columns must be adjusted so that they continue to have zero mean. The matrix multiply can be done efficiently with the banded matrix by using a banded solver algorithm.

3. The third approach is again like the first, but with a normalization step occurring before the matrix multiply.

4. The last approach is more complicated and sophisticated. The phase correlation expression $\vec{\Phi} \cdot R^{-1} \vec{\Phi}$ in the first approach is equated to $\vec{a} \cdot R^{-1} \cdot (\vec{a})$. While not a bad approximation, clearly this approximation breaks down for samples widely spaced in time. While it is not as critical for the expression to be as accurate for the separated data as the near adjacent data, nevertheless some statistics are in effect being ignored, and as a result information is lost. A more accurate approach is to first rewrite $\vec{\Phi} \cdot R^{-1} \cdot \vec{\Phi}$ in the mathematically equivalent form $$(\Phi_i - \Phi_{i+1}) \cdot (R'^{-1})_{i,j} \cdot (\Phi_j - \Phi_{j+1}),$$

where we define $R'^{-1}$ using the equation $$(R'^{-1})_{i,j} - (R'^{-1})_{i+1,j} - (R'^{-1})_{i,j+1} + (R'^{-1})_{i+1,j+1} = R^{-1}.$$

It turns out that there is a single well behaved solution to this equation due to the fact that the rows and columns of $R^{-1}$ have zero mean. In some sense, $R'^{-1}$ is a more natural representation of the statistics, since this matrix is non-singular, and the values fall off from the center diagonals. In this new form, we can now equate $$(\Phi_i - \Phi_{i+1}) \cdot (R'^{-1})_{i,j} \cdot (\Phi_j - \Phi_{j+1}) \text{ with } (a_i \cdot \overline{a_{i+1}} - 1) \cdot (dR'^{-1})_{i,j} \cdot (\overline{a_j} \cdot a_{j+1} - 1),$$

which is always accurate because adjacent amplitudes will always have nearly the same phase (as long as we sample adequately). This approach is probably as accurate as we would reasonably need. We now face the difficulty, however, of finding the minimum of a fourth-order expression, which is no longer a simple linear algebra problem. In practice we implement the solution using an iterative technique.

These four techniques were compared under varying conditions. The following table lists the output amplitude correlation $|mean(a_{est} \cdot \overline{a_0})|$ for the functions versus input noise level a for two samples per $t_0$.

| σ | 1. Linear | 2. Banded | 3. Pre-normalized | 4. Fourth-order |
|---|---|---|---|---|
| 0.25 | 0.99 | 0.99 | 0.99 | 0.99 |
| 0.5 | 0.96 | 0.96 | 0.96 | 0.96 |
| 1.0 | 0.87 | 0.87 | 0.85 | 0.88 |
| 1.5 | 0.75 | 0.75 | 0.72 | 0.76 |
| 2.0 | 0.64 | 0.64 | 0.59 | 0.64 |
| 2.5 | 0.55 | 0.55 | 0.50 | 0.55 |

Notice that the error in the output data can be reasonable even for very small signal-to-noise ratio. Also notice that the simple linear functions 1 and 2 performed almost as well as the iterative, non-linear function 4. Clearly the data should not be pre-normalized. Due to the simplicity with nearly the top performance, the banded matrix approach (2) is the implementation used in the SAINT reconstructor algorithm. It is possible that the algorithm for function 4 might be improved, however.

Acceleration Parameters

We tested implementation of acceleration parameters into most of the steps of the algorithm. By the term "acceleration parameter", we mean the general technique of overcorrecting the data:

newparameter=update(oldparameter)*α+oldparameter*(1−α)

Here α is a parameter somewhat greater than 1 that amplifies the update function. This is often referred to as overrelaxation.

There were no cases in the main iteration where acceleration parameters helped significantly, and the majority of the time they were counterproductive. The SAINT algorithm currently uses no acceleration parameters in the main algorithm. The subroutine that computes INUFT does use an acceleration parameter, however.

Coefficients

The image update formula described earlier was derived in two forms. Both can be described by the single general form $$img = INUFT \left[ \frac{\sum_t \left( \begin{array}{c} M(cfg, t, ap1, ap2) \cdot \\ a(cfg, t, ap1) \cdot \\ \overline{a(cfg, t, ap2)} \end{array} \right)}{\sum_t \left[ \begin{array}{c} (|a(cfg, t, ap1)|)^c \cdot \\ (|a(cfg, t, ap2)|)^c \end{array} \right]} \right]$$

where c was derived to be 0 or 2 depending on choice of error expression. Empirically, any value between 0 and 2 seems to work reasonably well. The choice c=1 is the value actually implemented in the SAINT algorithm.

Super Aperture

In order to measure the lowest spatial frequencies, one of the apertures must have at least 2 beams in it. Otherwise, the minimum baseline would be limited by the proximity of the apertures. We call this aperture the "super-aperture". We discovered, however, that the algorithm needs the super-aperture to have at least 3 beams. This makes intuitive sense, as it takes 3 beams to form a minimum triplet; having the three beams in one aperture essentially allows reconstruction all of the low spatial frequencies at high SNR. Once the low spatial frequencies reconstruct, the next higher spatial frequencies can piece together the correct phase, eventually moving out to the highest spatial frequencies.

Algorithm Summary

The algorithm iterates the following 4 steps:
5. image update, which uses the INUFT function,
6. amplitude update based on the image, in its simple form,
7. amplitude Kolmogorov filtering, using the banded matrix approach,
8. amplitude renormalization.

We have tested the algorithm by creating a set of artificial measurements. First a set of ideal spectrum values is created by simply taking the transform of the image. The spectrum values are taken on a non-uniform grid corresponding to the range of baselines defined by the possible beam configurations. Then the ideal measurements are modified by simulated phase disturbances according to the atmosphere model. Additional amplitude and phase disturbances are added to simulate the effect of measurement noise. This set of data is then fed into the reconstruction algorithm.

The case studied so far seems to converge within 100 iterations. This case uses the following parameters:
- 23 laser beams in 21 transmitter apertures,
- 7 clicker positions per aperture,
- 85 total configurations,
- 2.5 m satellite,
- 1000 km target range,
- 1.08 µ laser wavelength,
- 1 m telescope apertures,
- 1.73 m center-to-center spacing of transmitter telescope apertures,
- clicker spacing equal to Nyquist wavelength,
- 2 samples per $t_o$,
- 60 samples,
- SNR variable, but good performance with noise up to 10% of the DC level when accumulated over $t_0$ (14% per measurement for 2 samples per $t_0$).

Figure 6:
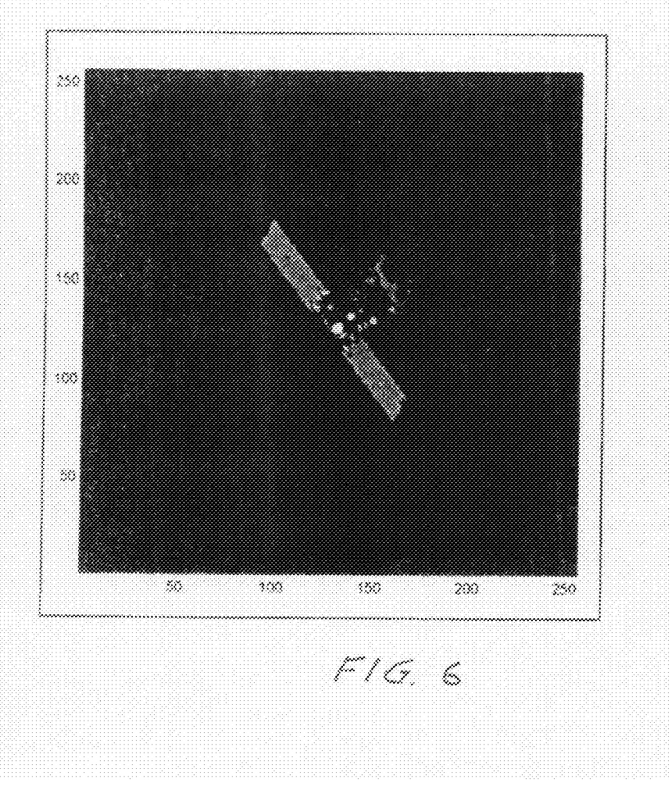
FIG. 6 shows a model target.
Figure 7:
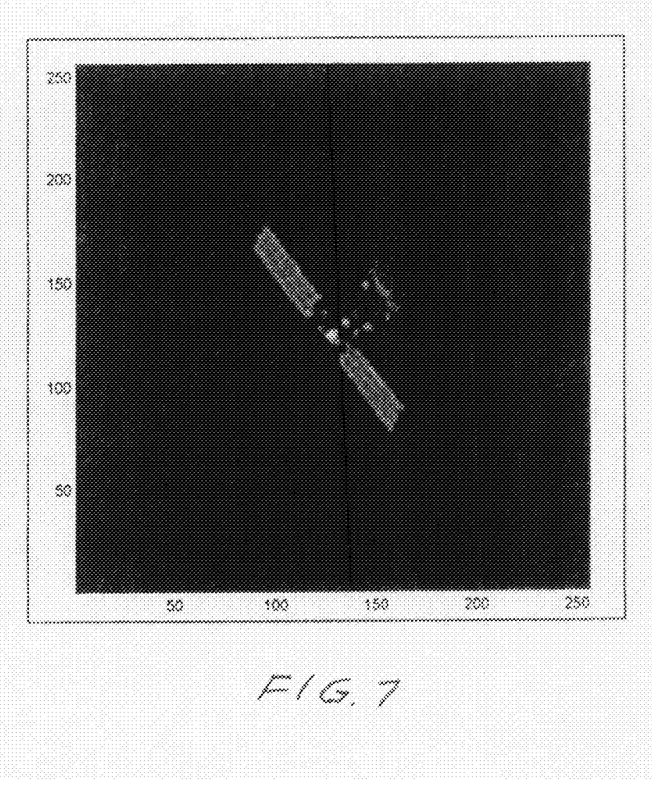
FIG. 7 shows an image reconstructed from data.

FIG. 6 shows the model target we have used to test the reconstructor. FIG. 7 shows the image reconstructed from a data set having the parameters given above.

A measure of the accuracy of the reconstruction is given by the image Strehl. This is the maximum value of the normalized incoherent image cross correlation function. The Strehl value for this reconstruction is 0.89.

Figure 8:
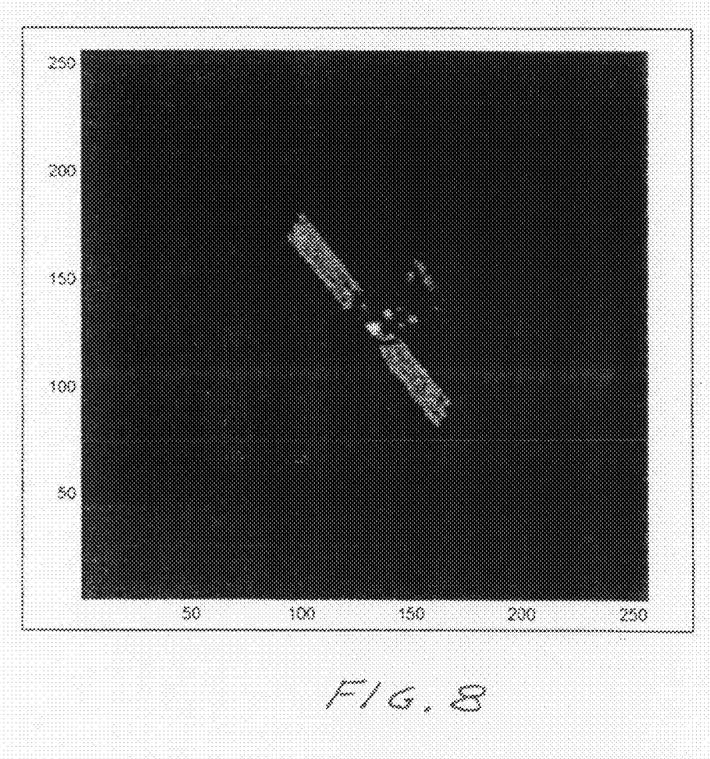
FIG. 8 shows the effects of reducing the amount of input data.

The reconstruction is successful over a wide range of data set parameters. For example, if we reduce the number of samples per configuration to 30, the number of configurations to 41, and the number of reconstructor iterations to 10, we get the image shown in FIG. 8. The major features of the image are still recognizable but the Strehl is reduced to 0.82.

VARIATIONS

The reader should understand that the present invention is not limited to the specific embodiments described above and that many modifications and additions or deletions could be made to those described embodiments. Therefore, the scope of the invention should be determined by the appended claims and their legal equivalents.

What is claimed is:

1. A system for imaging a far away fast moving target comprising:
   A) a number greater than five of separate laser sources each of said separate laser sources located separately from the other laser sources with each of the separate laser sources adapted to produce a laser beam shifted in frequency with respect to each other beam so as to produce a large number of beat frequencies in a composite beam directed at the target;
   B) a laser positioning system adapted to rapidly change the positions of each of the laser sources during an illumination period of a few seconds,
   C) a large number of at least 20 light buckets adapted to collect and light reflected from the target;
   D) data storage electronics adapted to store information developed from the light collected by the light buckets to define the light intensity collected by each of the light bucket as a function of time;
   E) electronic adapted to monitor and store positions and frequencies of each of the laser sources as a function of time; and
   F) one or more computer processors programmed with algorithms for analyzing the stored information defining the intensity of the collected reflected light as a function of time and the positions of the laser sources as a function of time to produce images of the target.

* * * * *